(12) United States Patent
Zhang et al.

(10) Patent No.: US 8,832,369 B2
(45) Date of Patent: Sep. 9, 2014

(54) SYSTEMS AND METHODS FOR REMOTE RAID CONFIGURATION IN AN EMBEDDED ENVIRONMENT

(75) Inventors: Weijia Zhang, Round Rock, TX (US); Patrick O. Boyd, Round Rock, TX (US); Vance E. Corn, Austin, TX (US); William C. Edwards, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 779 days.

(21) Appl. No.: 12/925,673

(22) Filed: Oct. 27, 2010

(65) Prior Publication Data

US 2012/0110262 A1    May 3, 2012

(51) Int. Cl.
*G06F 12/00* (2006.01)
*G06F 3/06* (2006.01)

(52) U.S. Cl.
CPC ............ *G06F 3/0689* (2013.01); *G06F 3/0629* (2013.01); *G06F 3/0632* (2013.01); *G06F 3/0607* (2013.01)
USPC .................... 711/114; 711/170; 711/E12.084

(58) Field of Classification Search
CPC ... G06F 3/0607; G06F 3/0629; G06F 3/0632; G06F 3/0689
USPC .................................................. 711/114, 170
See application file for complete search history.

(56) References Cited

U.S. PATENT DOCUMENTS

| | | | |
|---|---|---|---|
| 5,603,005 A | 2/1997 | Bauman et al. | |
| 5,717,942 A | 2/1998 | Haupt et al. | |
| 6,108,697 A | 8/2000 | Raymond et al. | |
| 6,144,992 A | 11/2000 | Turpin et al. | |
| 6,298,443 B1 | 10/2001 | Colligan et al. | |
| 6,408,334 B1 | 6/2002 | Bassman et al. | |
| 6,470,446 B1 | 10/2002 | Beelitz et al. | |
| 6,519,679 B2 | 2/2003 | Devireddy et al. | |
| 6,763,458 B1 | 7/2004 | Watanabe et al. | |
| 6,854,122 B1 | 2/2005 | Sheriff et al. | |
| 6,973,587 B1 | 12/2005 | Maity et al. | |
| 7,028,138 B2 | 4/2006 | Ali et al. | |
| 7,216,200 B2 | 5/2007 | Zhang et al. | |
| 7,272,815 B1 | 9/2007 | Eldridge et al. | |
| 7,360,211 B2 | 4/2008 | Hyden et al. | |
| 7,426,052 B2 | 9/2008 | Cox et al. | |

(Continued)

OTHER PUBLICATIONS

Harmer, "Methods and Systems for Providing Manufacturing Mode Detection and Functionality in a UEFI BIOS", U.S. Appl. No. 12/228,499, filed Aug. 13, 2008, 20 pgs.

(Continued)

*Primary Examiner* — Aracelis Ruiz
(74) *Attorney, Agent, or Firm* — Egan, Peterman & Enders LLP.

(57) ABSTRACT

Remote RAID system configuration may be implemented in an embedded and out-of-band manner using an information handling system configured, for example, as a RAID server. The remote RAID configuration may be implement, for example, on a RAID server system in the condition as it is supplied directly out-of-the-box to a user without requiring downloading of any additional software or firmware, without requiring presence of a management framework and plug in, and/or in a manner that is operating system (OS)-independent or that requires no OS to be present on the server. The RAID server may then be remotely reconfigured one or more times thereafter.

28 Claims, 6 Drawing Sheets

(56) References Cited

U.S. PATENT DOCUMENTS

| | | |
|---|---|---|
| 7,430,592 B2 | 9/2008 | Schmidt et al. |
| 7,526,541 B2 | 4/2009 | Roese et al. |
| 7,610,575 B2 | 10/2009 | Sproule |
| 7,706,369 B2 | 4/2010 | Roese et al. |
| 7,739,372 B2 | 6/2010 | Roese et al. |
| 7,739,402 B2 | 6/2010 | Roese et al. |
| 7,765,371 B2 | 7/2010 | Abels et al. |
| 7,805,533 B2 | 9/2010 | Burns et al. |
| 7,877,614 B2 | 1/2011 | Frenkiel et al. |
| 7,895,428 B2 | 2/2011 | Boland et al. |
| 7,898,977 B2 | 3/2011 | Roese et al. |
| 7,945,945 B2 | 5/2011 | Graham et al. |
| 8,086,834 B2 | 12/2011 | Brisky et al. |
| 8,099,624 B1 | 1/2012 | Saxena et al. |
| 8,191,107 B1 | 5/2012 | Frattura et al. |
| 8,260,841 B1* | 9/2012 | Maity ................. 709/202 |
| 8,510,422 B2* | 8/2013 | Phung et al. .............. 709/222 |
| 2003/0216143 A1 | 11/2003 | Roese et al. |
| 2004/0162857 A1 | 8/2004 | Butts |
| 2005/0027837 A1 | 2/2005 | Roese et al. |
| 2005/0055688 A1 | 3/2005 | Barajas et al. |
| 2005/0066015 A1 | 3/2005 | Dandekar et al. |
| 2005/0076245 A1 | 4/2005 | Graham et al. |
| 2005/0172280 A1 | 8/2005 | Ziegler et al. |
| 2005/0216664 A1* | 9/2005 | Taninaka et al. .............. 711/114 |
| 2005/0237996 A1 | 10/2005 | Sakuraba et al. |
| 2006/0018505 A1 | 1/2006 | Cherian et al. |
| 2006/0031936 A1 | 2/2006 | Nelson et al. |
| 2006/0036730 A1 | 2/2006 | Graham et al. |
| 2006/0048142 A1 | 3/2006 | Roese et al. |
| 2006/0075093 A1 | 4/2006 | Frattura et al. |
| 2006/0190532 A1 | 8/2006 | Chadalavada |
| 2006/0212143 A1 | 9/2006 | Nguyen et al. |
| 2007/0124407 A1 | 5/2007 | Weber et al. |
| 2007/0162695 A1 | 7/2007 | Ali et al. |
| 2007/0168049 A1 | 7/2007 | Rao et al. |
| 2007/0204105 A1 | 8/2007 | Lauffer et al. |
| 2008/0002694 A1 | 1/2008 | Brahmaroutu et al. |
| 2008/0033972 A1 | 2/2008 | Yin et al. |
| 2008/0126551 A1 | 5/2008 | Conner et al. |
| 2008/0155094 A1 | 6/2008 | Roese et al. |
| 2008/0201501 A1 | 8/2008 | Partani et al. |
| 2009/0037655 A1 | 2/2009 | Cherian et al. |
| 2010/0057987 A1* | 3/2010 | Liu ................. 711/114 |
| 2010/0268925 A1 | 10/2010 | Brisky et al. |
| 2010/0306773 A1 | 12/2010 | Lee et al. |
| 2011/0072280 A1 | 3/2011 | Chiasson et al. |
| 2011/0078293 A1 | 3/2011 | Phung et al. |
| 2011/0173427 A1 | 7/2011 | Merkin et al. |
| 2011/0264951 A1 | 10/2011 | Pratt et al. |
| 2011/0289350 A1 | 11/2011 | Andrews et al. |
| 2011/0296404 A1 | 12/2011 | Zhang et al. |
| 2012/0110262 A1 | 5/2012 | Zhang et al. |
| 2012/0198245 A1 | 8/2012 | Mundt et al. |
| 2012/0317633 A1 | 12/2012 | O'Donnell et al. |

OTHER PUBLICATIONS

IBM, "Navigator for 1", Printed From Internet May 26, 2009, 3 pgs.
IBM, "IBM iSeries Navigator System Management Plug-In for SAP", Printed From Internet May 26, 2009, 1 pg.
Business Wire; Business Services Industry, "F5 and Oracle Collaborate to Release Big-Ip Load Balancer System Management Plug-In for Oracle Enterprise Manager 10g Grid Control", Oct. 31, 2005, 10 pgs.
Highbeam Research, "Nimsoft Team Up With Oracle", Printed From Internet May 26, 2009, 4 pgs.
All Business, "Oracle Releases F5 Management Plug-In Via iControl", Printed From Internet May 26, 2009, 4 pgs.
Warren Togami, "Remote Conversion to Linux Software RAID-1 for Crazy Sysadmins HOWTO", 2004, 11 pgs.
"Remote Raid/Mirror", HTMICenter, Printed From Internet Jul. 22, 2010, 2 pgs.
Power6 Information, "Installing an HA-two system RAID Configuration", Printed From Internet Jul. 22, 2010, 4 pgs.
Chiasson et al., "Systems and Methods for Time-Based Management of Backup Battery Life in Memory Controller Systems", Filed Sep. 21, 2009, U.S. Appl. No. 12/586,368, 33 pgs.
Phung et al., "Systems and Methods for Extension of Server Management Functions", Filed Sep. 30, 2009, U.S. Appl. No. 12/587,001, 25 pgs.
Phung et al., "Systems and Methods for Extension of Server Management Functions", U.S. Appl. No. 13/898,991, filed May 21, 2013, Preliminary Amendment, Jun. 27, 2013, 18 pgs.
Wikipedia, "License Manager" Printed from Internet Jun. 20, 2012, 2 pgs.
Zhang et al., "Systems and Methods for Out-Of-Band Backup and Restore of Hardware Profile Information", U.S. Appl. No. 13/365,901, filed Feb. 3, 2012, 37 pgs.
McNeill, "Virtual Machine Asynchronous Patch Management", U.S. Appl. No. 13/210,552, filed Aug. 16, 2011, 17 pgs.
Karandikar et al., "System and Method for Providing an Image to an Information Handling System", U.S. Appl. No. 13/174,221, filed Jun. 30, 2011, 35 pgs.
Andrews et al., "System and Method for Removable Network Attached Storage Enabling System Recovery From Backup", U.S. Appl. No. 13/187,219, Jul. 20, 2011, 30 pgs.
Zhang et al., "Systems and Methods for Intelligent System Profile Unique Data Management", U.S. Appl. No. 13/618,666, filed Sep. 14, 2012, 32 pgs.
Phung et al., "Systems and Methods for Extension of Server Management Functions", U.S. Appl. No. 13/898,991, filed May 21, 2013, 25 pgs.
Phung et al. "Systems and Methods for Extension of Server Management Functions", U.S. Appl. No. 12/587,001; Office Action, Jun. 15, 2012, 13 pgs.
Phung et al., "Systems and Methods for Extension of Server Management Functions", U.S. Appl. No. 12/587,001, Amendment, Filed Oct. 15, 2012, 16 pgs.

* cited by examiner

SYSTEMS AND METHODS FOR REMOTE RAID CONFIGURATION IN AN EMBEDDED ENVIRONMENT

FIELD OF THE INVENTION

This invention relates generally to information handling systems and, more particularly, to remote RAID configuration using embedded system management.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems and methods for controlling data transfer to and from a redundant array of independent disks (RAID) memory storage system are known in the art. A RAID system is a data storage system wherein data is distributed across a group of storage hard disk drives functioning as a small storage unit. Often, information stored on each disk is duplicated on other disks in the array, creating redundancy to ensure no information is lost if disk failure occurs.

RAID configuration is an important feature for RAID system management. Common methods for implementing RAID configuration include RAID configuration tools that are launched by a user locally on a RAID server, i.e., using CD/DVD or control keys such as CTRL-A (or CTRL-R or CTRL-C in the SAS controllers), F10, or a complex system management system. Conventional methods for implementing RAID configuration also require downloading of an agent or utility onto the target RAID system.

RAID information handling systems are generally configured in different types of RAID implementations that are each enabled with a variety of hardware and software component configurations. Successful imaging of a RAID drive is dependent on the specific computer model, driver controller, hard drive and RAID implementation so that preparation and loading of a particular configuration on a RAID server information handling system is generally performed at a RAID server using vendor-specific deployment products. Local deployment of RAID configurations with vendor specific applications generally restricts incorporation of manufacture of RAID servers with other types of information handling systems. For instance, due to the complexity of RAID deployment utilities and the variety of hardware generally used for RAID drives, deployment software vendors typically do not integrate RAID utilities into their deployment applications, instead generally providing a hook to third party components to implement RAID features or assuming that target systems are in a desired RAID configuration before software deployment. One example is a deployment application which configures RAID drives with scripts. Another example is an application which implements code that allows users to write RAID modules on a management server that, in turn, downloads the modules to a target RAID server to perform a RAID configuration task for each module.

SUMMARY OF THE INVENTION

Disclosed herein are embedded systems and methods that may be implemented for RAID system configuration. As used herein, the term "embedded" means integrated within the system, subsystem or chassis. In one embodiment, the disclosed systems and methods may be employed to implement a remote RAID configuration system that is embedded and permanently maintained over time within an information handling system (e.g., that is configured as a RAID server). In such an embodiment, the remote RAID configuration system may be utilized to provide users with an out-of-band user-experience for out-of-the-box servers in originally configuring server storage without requiring any separate management framework (i.e., such as a separate set of system management applications like OpenManage available from Dell Computer of Round Rock, Tex.) or external tools (i.e., such as Dell OpenManage Deployment ToolKit, Dell OpenManage Server Update Utility—SUU), as well as to provide for future reconfiguration of the server storage.

In another embodiment, the disclosed systems and methods may be employed to implement embedded systems management to carry out configuration of a RAID system remotely and without the need to download additional software or firmware (e.g., such as agent or utility) onto the target RAID system. Thus, using the disclosed systems and methods, a manufacturer or other enterprise provider may ship an information handling system configured as a RAID system server having an embedded RAID configuration system to a user, and the user may then deploy the RAID system server as part of a RAID system and employ the embedded RAID configuration system to remotely configure the RAID system without need for loading or downloading any additional firmware or software.

Thus, the disclosed systems and methods may advantageously be implemented in one embodiment to allow a RAID system server to be remotely RAID configured in a manner that can be performed on the RAID server as it is supplied directly out-of-the-box to a user (e.g., in the same server configuration as shipped by the manufacturer or enterprise provider), and without requiring a centralized deployment environment, e.g., no separate server or other information handling system is required to provide RAID configuration information to the RAID system server. The disclosed systems and methods may also be advantageously employed to perform remote RAID configuration without requiring downloading of additional software or firmware (e.g., such as agent or utility), without requiring presence of a management framework and plug in, and/or in a manner that is operating system, (OS)-independent or that requires no OS to be present on the server. Further advantageously, the disclosed systems and methods may be employed to remotely configure a RAID system server anytime during the life of the RAID server, and/or as many times as desired, e.g., the RAID system server may be configured and then re-configured one or more times using the disclosed systems and methods.

In one respect, disclosed herein is an information handling system, including: a RAID controller circuit for controlling the transfer of data to and from RAID storage memory that includes an array of individual storage disk drives; one or more processing devices; persistent storage coupled to the one or more processing devices, and to the RAID controller circuit; and an embedded remote RAID configuration framework present on the persistent storage. The remote RAID configuration framework may be configured to: receive a request for RAID configuration from a remote user, and provide the received RAID configuration request to the one or more processing devices for processing. The one or more processing devices may be configured to: process the received RAID configuration request in an out-of-band manner to create a RAID configuration job corresponding to the received request for RAID configuration, and then execute the created RAID configuration job in an in-band manner.

In another respect, disclosed herein is a RAID system, including: a RAID storage memory that includes an array of individual storage disk drives; and an information handling system coupled to the RAID storage memory. The information handling system may include: a RAID controller circuit for controlling the transfer of data to and from the RAID storage memory, an in-band processing device, an out-of-band processing device, persistent storage coupled to each of the in-band processing device, out-of-band processing device, and RAID controller circuit, and an embedded remote RAID configuration framework present on the persistent storage. The remote RAID configuration framework may be configured to: receive a request for RAID configuration from a remote user, and provide the received RAID configuration request to the out-of band processing device. The out-of-band processing device may be configured to: create a RAID configuration job corresponding to the received request for RAID configuration, and provide the created RAID configuration job to the in-band processing device for execution. The in-band processing device may be configured to receive the created RAID configuration job from the out-of-band processing device and then execute the created RAID configuration job.

In another respect, disclosed herein is a method for remotely configuring or reconfiguring a RAID system, including: providing a RAID storage memory that includes an array of individual storage disk drives; providing an information handling system coupled to the RAID storage memory, the information handling system including: one or more processing devices, persistent storage coupled to the one or more processing devices, and an embedded remote RAID configuration framework present on the persistent storage; receiving a request in the embedded remote RAID configuration framework for RAID configuration from a remote user; providing the received RAID configuration request from the embedded remote RAID configuration framework to the one or more processing devices for out-of-band processing; using the one or more processing devices to process the received RAID configuration request in an out-of-band manner to create a RAID configuration job; and using the one or more processing devices to execute the created RAID configuration job in an in-band manner.

In another respect, disclosed herein is a method of providing an information handling system. The method may include providing the information handling system before first coupling to a RAID storage memory, and the provided information handling system may include: a RAID controller circuit for controlling the transfer of data to and from RAID storage memory that includes an array of individual storage disk drives; one or more processing devices; persistent storage coupled to the one or more processing devices, and to the RAID controller circuit; and an embedded remote RAID configuration framework present on the persistent storage. The remote RAID configuration framework may be configured to: receive a request for RAID configuration from a remote user, and provide the received RAID configuration request to the one or more processing devices for processing. The one or more processing devices may be configured to: process the received RAID configuration request in an out-of-band manner to create a RAID configuration job corresponding to the received request for RAID configuration, and then execute the created RAID configuration job in an in-band manner.

DESCRIPTION OF ILLUSTRATIVE EMBODIMENTS

Figure 1:
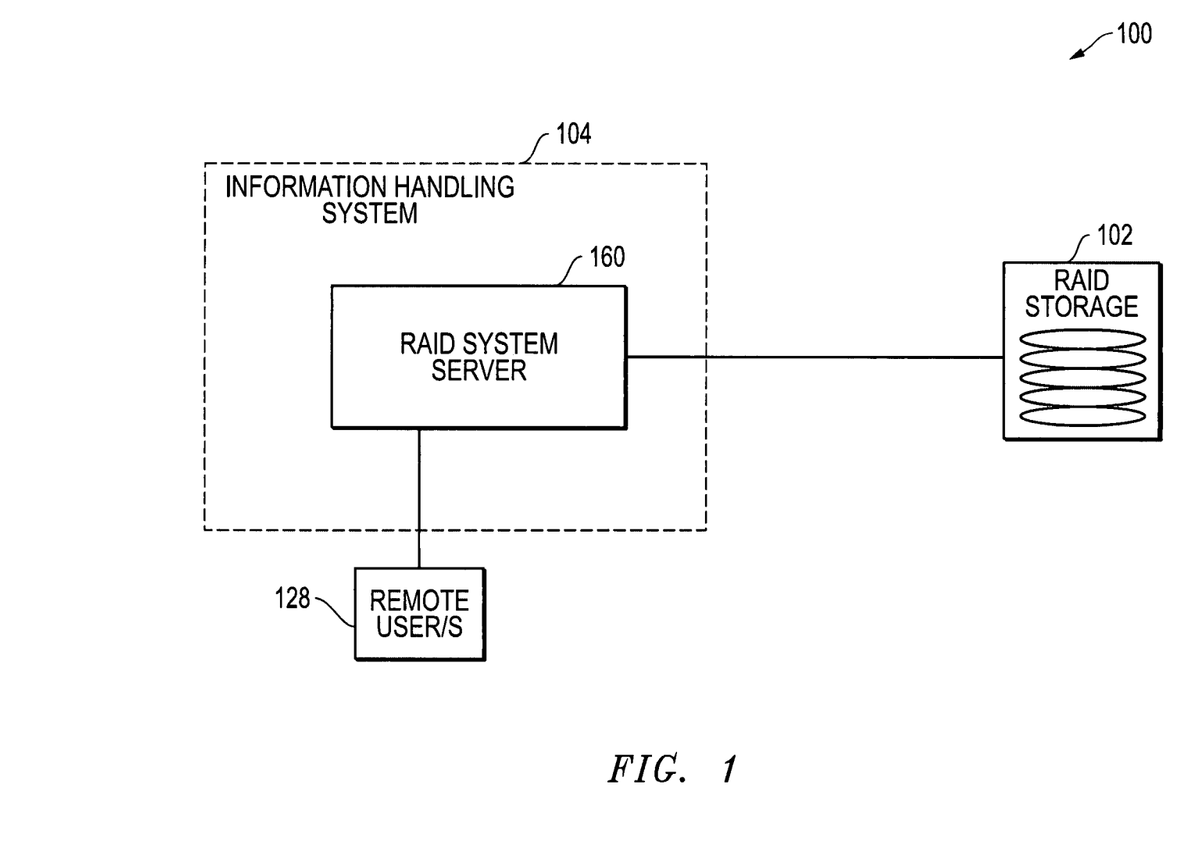
FIG. 1 is a simplified block diagram of a RAID system according one exemplary embodiment of the disclosed systems and methods.

FIG. 1 shows illustrates RAID system 100 according to one exemplary embodiment of the disclosed systems and methods. As shown, RAID system 100 includes an information handling system 104 having a RAID system server 160 coupled to RAID storage memory 102. RAD storage memory 102 includes an array of individual storage hard disk drives (RAID array) functioning as a single storage unit to which data is written by RAID system server 160. RAID system server 160 writes data to RAID storage memory 102 in a manner such that data is distributed across the multiple storage drives. Information stored on each disk drive of RAID storage memory may be duplicated on other disks in the array, e.g., to create redundancy so that no data is lost if disk failure occurs. It will be understood that RAID system 100 illustrated in FIG. 1 is exemplary only, and that other RAID system configurations are possible. Also shown in FIG. 1 are remote user/s 128 that are provided remote access to configure aspects of RAID system 100 from a remote location in a manner as will be described further herein.

Figure 2:
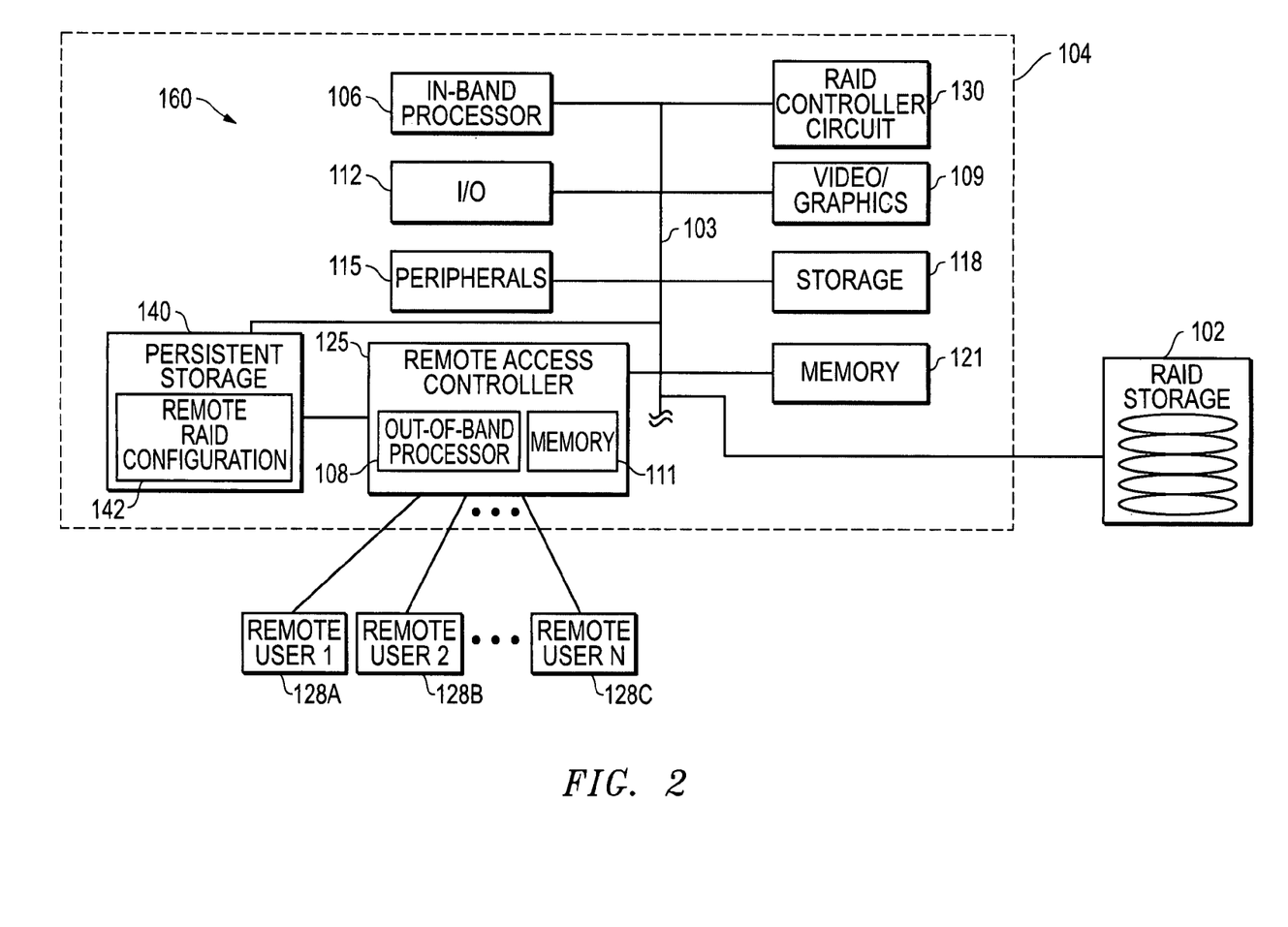
FIG. 2 is a simplified block diagram of an information handling system according to one exemplary embodiment of the disclosed systems and methods.

FIG. 2 is a block diagram of an information handling system 104 as it may be configured according to one exemplary embodiment as to function as RAID system server 160 of FIG. 1. As shown, system 104 may include one or more in-band processors 106, one or more buses or communication media 103, video/graphics hardware 109, storage 118, memory 121, input/output (I/O) 112, peripherals 115, remote access controller 125 having one or more out-of-band processors 108 and memory 111, and RAID controller circuit 130 (e.g., RAID card such as PowerEdge RAID Controller (PERC) card available from Dell, Inc). RAID controller circuit 130 is present for controlling transfer of data to and from RAID storage 102. Further information on RAID controller circuits may be found, for example, in U.S. patent application Ser. No. 12/586,368, filed on Sep. 21, 2009, and incorporated herein by reference in its entirety for all purposes.

Still referring to FIG. 2, bus 103 provides a mechanism for the various components of system 104 to communicate and couple with one another. In-band processor 106 may include a Host processor (e.g., CPU) running a host operating system (OS) for RAID system server 160, and out-of-band processor 108 may be a service processor, embedded processor, etc. Video/graphics 109, storage 118, memory 121, I/O 112 and peripherals 115 may have the structure, and perform the functions known to those of skill in the art. Besides memory 121 (e.g., RAM), processor 106 may include cache memory for storage of frequently accessed data, and storage 118 may include extended memory for processor 106. It will be understood that the embodiment of FIG. 2 is exemplary only, and that an information handling system may be provided with one or more processing devices that may perform the functions of processor 106, processor 108, remote access controller 125, and other optional processing devices. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 2 is exemplary only, and that other information handling system architectures may be employed in the practice of the disclosed systems and methods.

The disclosed systems and methods may be implemented in one exemplary embodiment using a plug-in architecture framework to allow extension of RAID system server management functionalities (e.g., using Dell unified server configurator ("USC") server management functionalities available from Dell Products L.P. of Round Rock, Tex.) in a unified extension firmware interface ("UEFI") environment by leveraging available remote access controller core or optional flash memory space. Further information on implementation of USC functionalities in a UEFI environment may be found, for example, in U.S. patent application Ser. No. 12/587,001 filed Sep. 30, 2009, and incorporated herein by reference in its entirety for all purposes. Among other things, the disclosed systems and methods may be implemented to provide a hardware and software interface to allow use of a plug-in framework in the embedded system management that may be run under the BIOS firmware and the UEFI environment. The disclosed systems and methods may also be implemented to provide a USC server management architecture that may be modified and enhanced over time, and/or that may also be employed to extend availability of the USC server management framework to remote users 128.

Still referring to FIG. 2, remote access controller 125 provides access to a plurality of remote users 128A-128C, although access may be provided to a single user 128 in other embodiments. In this regard, remote access controller 125 allows remote users to manage, administer, use, and/or access various resources of host system 100 (e.g., either native or virtual) from a remote location. However, remote access may be provided to information handling system 104 using any other configuration suitable for accomplishing the remote RAID configuration and/or reconfiguration functions as described further herein.

In the embodiment of FIG. 2, remote users 128A-128C may have in-band or out-of-band access to system 100 as desired: For example, remote users 128A-128C may have wired and/or wireless access through a local area network (LAN), wide area network (WAN), wireless local area network (WLAN), wireless wide area network (WWAN), dial-up modem, etc. In one embodiment, remote access controller 125 may be an integrated Dell Remote Access Controller (iDRAC) available from Dell Products L.P. of Round Rock, Tex. Further information on such a remote access controller may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

As further shown, remote access controller 125 is coupled to remote access controller persistent storage 140 (e.g., embedded and partitioned flash memory, Electrically Erasable Programmable Read Only Memory—EEPROM, etc.), upon which one or more server management applications forming part of a USC framework may be stored in addition to one or more components or applications forming part of an embedded remote RAID configuration framework 142 and other functions, e.g., BIOS, unified extensible firmware interface ("UEFI") modules, etc. In the embodiment of FIG. 1, persistent storage 140 is managed by remote access controller 125 and may be utilized for RAID system configuration management. In one exemplary embodiment, persistent storage 140 may be embedded in the system motherboard and may be, for example, about 1GB in size.

Figure 3:
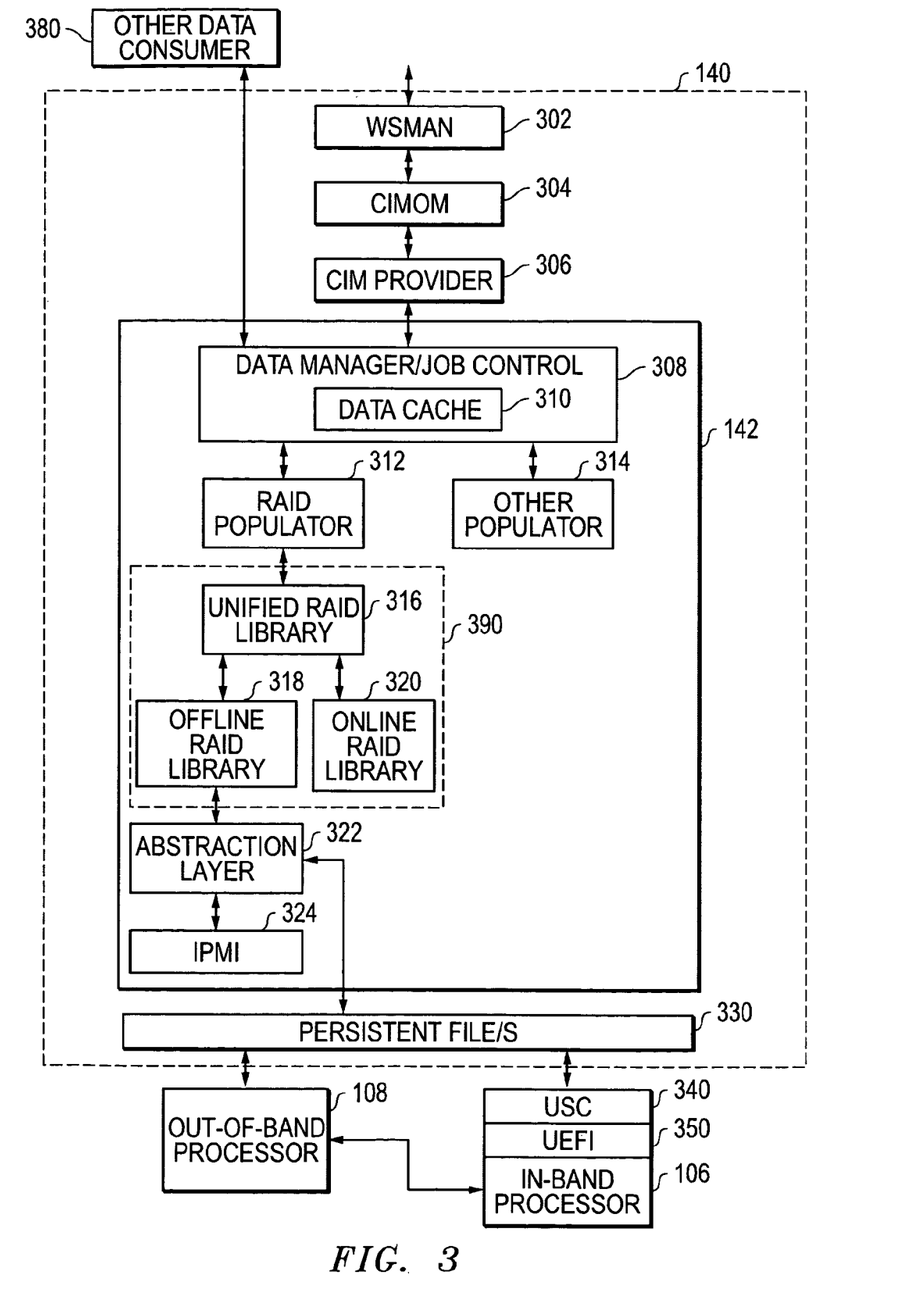
FIG. 3 illustrates an embedded remote RAID configuration framework according to one exemplary embodiment of the disclosed systems and methods.

FIG. 3 shows how an embedded remote RAID configuration framework 142 may be configured in one exemplary embodiment to interface with other components of RAID system server 160. As shown in FIG. 3, a remote client interface 302 may be configured to receive configuration commands from a remote client via remote access controller 125 using an appropriate protocol for the particular interface 302, e.g., to allow one or more remote user/s 128 to remotely configure RAID system 100 in an out-of-band manner that is performed separately from in-band (e.g., Host) processor 106 and the associated operating system of RAID system server 160. A remote client interface 302 may be a standards-based interface such as a Web Service Management (WSMAN") protocol interface layer as shown or may be any other suitable interface technology. As further shown in FIG. 3, an optional object manager 304 (e.g., common information model object manager "CIMOM" or other suitable object manager) may be optionally employed to facilitate communication with the remote RAID configuration framework 142 and management by a variety of types of remote users 128. Additionally, other data consumer/s 380 (e.g., command line interface "CLI" utility, webpage; etc.) may be optionally provided with the capability of communicating with components of embedded remote RAID configuration framework 142 as shown.

As further shown in FIG. 3, a provider layer 306 may be present in communication with the remote client interface 302 to interpret RAID configuration requests. In the illustrated embodiment, provider layer 306 is configured as a common information model (CIM) provider layer corresponding to CIMOM 304, although any other type and/or configuration of provider layer suitable for communicating with a particular client interface 302 and/or object manager 304 may be employed. As illustrated, provider layer 306 may be configured to send a RAID configuration request via an optional bi-directional Data Manager/Job Control layer 308 (e.g., acting in part as a cache layer that speeds up communication) to a Raid Populator 312 that performs the task of interpreting every RAID specific command at a low level and writing it into the Data Manager layer 308. In this regard, the Data Manager/Job Control layer 308 may include a data cache layer 310 that is present to allow RAID configuration parameters and data to be cached in memory before being committed to a storage location in persistent filth 330. Data Manager/Job Control layer 308 may also be optionally configured to control the invocation and tracking of RAID configuration jobs. It will be understood that the particular configuration of Data Manager/Job Control layer 308 is exemplary, and that it is not necessary that layer 308 be present. Also shown present in the embodiment of FIG. 3 is optional populator 314 that may be present for interpreting non-RAID types of commands such as commands associated with Network Controllers, System BIOS, etc.

As shown in FIGS. 2 and 3, persistent storage 140 may be accessible via both in-band processor 106 (e.g., system Host processor running user operating system, etc.) and out-of-band processor 108 (e.g., service processor, embedded processor, etc.) of the RAID system server 160 in order to share stored raid configuration parameters and data. USC module/s 340 (e.g., including UEFI components) may be running as shown on in-band processor 106 as shown for purposes of viewing and manipulating system configurations, and USC module/s 340 may communicate with out-of-band processor 108 via IPMI. A low level abstraction layer 322 may be present to abstract the format of the database from other entries, and to generate RAID configuration tasks and store the operation sequence in a persistent file/s 330 on persistent storage 140. One or more RAID configuration interface modules 350 (e.g., unified extension firmware interface "UEFI" modules) may be provided to carry out the RAID configuration tasks. An intelligent platform management interface ("IPMI") application programming interface ("API") 324 configured to enable communication between processes running in different environments and context may be provided as shown to facilitate communication components of persistent storage 140.

Also shown in FIG. 3 are RAID library components 390 that are provided to communicate between Data Manager/Job Control layer 308 and abstraction layer 322. In this exemplary, embodiment RAID library components 390 include unified RAID library 316, offline RAID library 318 and online RAID library 320. Unified RAID library 316 is an optional component that may be provided and configured for storing RAID options and/or RAID operation information that are not recognized by a standard RAID card (e.g., to restrict or prohibit use of certain RAID storage disks 102 that are detected by the system as having problems or are going bad, to store customized library functions, etc.). Offline RAID library 318 is another optional component that may be present to cache one or more previous RAID configuration settings. Online RAID library 320 communicates directly with RAID controller circuit 130 and is present to facilitate communication between out-of-band processor 108 and RAID controller circuit 130 of RAID system server 160 without requiring participation of in-band processor 106. In this regard, online RAID library 320 communicates directly with RAID controller circuit 130 to implement RAID configuration and/or reconfiguration tasks that result from the RAID configuration requests that are processed by embedded remote RAID configuration framework 142, in-band processor 106 and out-of-band processor 108 in the manner described elsewhere herein.

Figure 4:
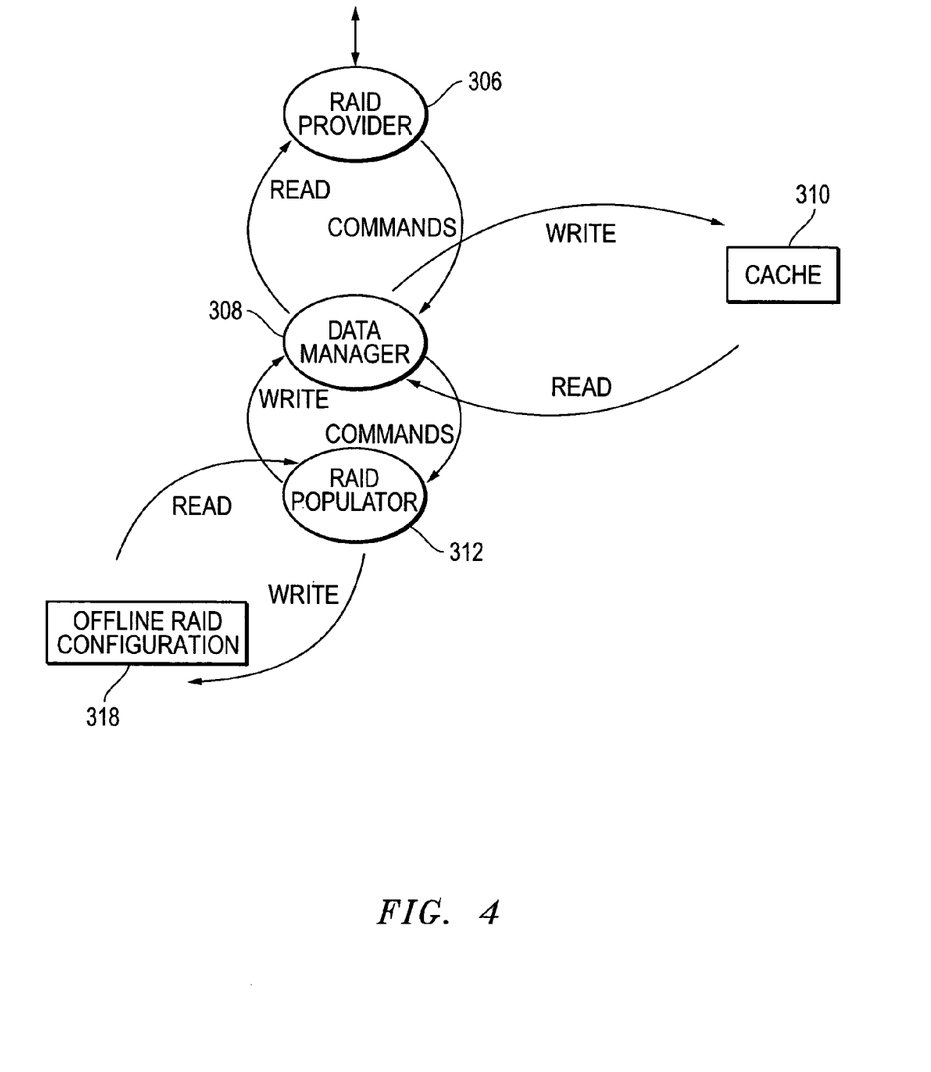
FIG. 4 illustrates internal functional interrelation between certain components of an embedded remote RAID configuration framework according to one exemplary embodiment of the disclosed systems and methods.

FIG. 4 illustrates one embodiment of internal functional interrelation between certain components of embedded remote RAID configuration framework 142 of FIG. 3. In this embodiment, RAID provider layer 306 receives and interprets RAID configuration requests that originate from a given remote user. Examples of such requests include, but are not limited to, "create", "delete", "change", "get", etc. Provider layer 306 provides these configuration requests in the form of commands to Data Manager/Job Control layer 308, which in turn provides these commands to Raid Populator 312. Raid Populator 312 in turn interprets the RAID specific commands and writes them back into the Data Manager layer 308 in the form of pending attributes for purposes of storing the desired change. Raid Populator 312 also writes changes and commands to offline RAID library 318 for purposes of performing configuration changes. When needed, RAID populator 312 may retrieve committed and current data from offline RAID library 318 for purposes of populating or repopulating the objects in the data manager. As further shown in FIG. 4, data Manager/Job Control layer 308 also writes RAID configuration parameters and data to cache memory 310, and reads back these RAID configuration parameters and data when needed. This procedure is used for purposes of accomplishing data retrieval and sets within the defined time constraints. Data Manager/Job Control layer 308 may also be optionally configured to write response and results back to RAID provider layer 306 as shown for purposes of reporting.

Figure 5:
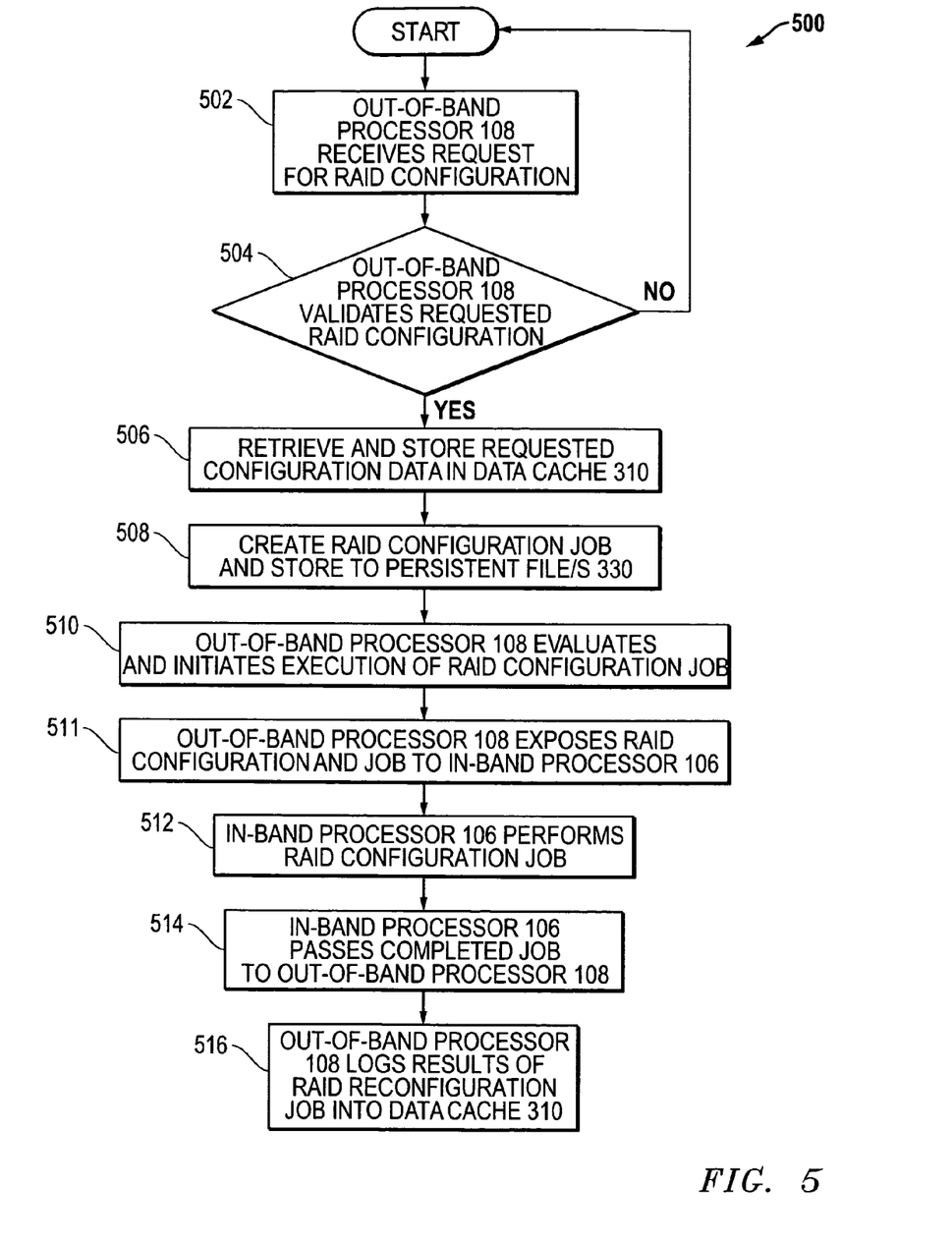
FIG. 5 illustrates RAID configuration methodology according to one exemplary embodiment of the disclosed systems and methods.

In one exemplary embodiment remote RAID configuration (or remote RAID reconfiguration) may be performed using embedded remote RAID configuration framework 142 of FIG. 3 using methodology 500 illustrated in FIG. 5. As shown, in step 502 out-of-band processor 108 (e.g., acting as a configuration request processor) may receive a command from a remote user 128 via embedded remote RAID configuration framework 142 for a RAID configuration which operates to process the request in the manner as previously described and illustrated. This request may be provided by abstraction layer 322 to persistent file/s 330 of RAID library components 390, and then accessed from persistent file/s 330 by out-of-band processor 108. In step 504, out-of-band processor 108 then validates the requested RAID configuration by populator request. Upon successful validation, methodology 500 proceeds to step 506 where out-of-band processor 108 retrieves the requested configuration data from a configuration database and caches the retrieved data in a designated Raid Data Objects space of data cache 310 of the Data Manager layer 308. In step 508, out-of-band processor 108 (still acting as a configuration request processor) may create a RAID Configuration Job and commit this job to store the RAID configuration data to the persistent storage file/s 330 of the embedded remote RAID configuration framework 142, e.g., in storage space designated as Pending Database (DB). In one exemplary embodiment, the Pending DB is a storage space within persistent storage file/s 330 that can be accessed by the out-of band processor 108 by direct mount and by the in-band processor 106 (e.g., Host processor) through virtual media attachment.

Figure 6:
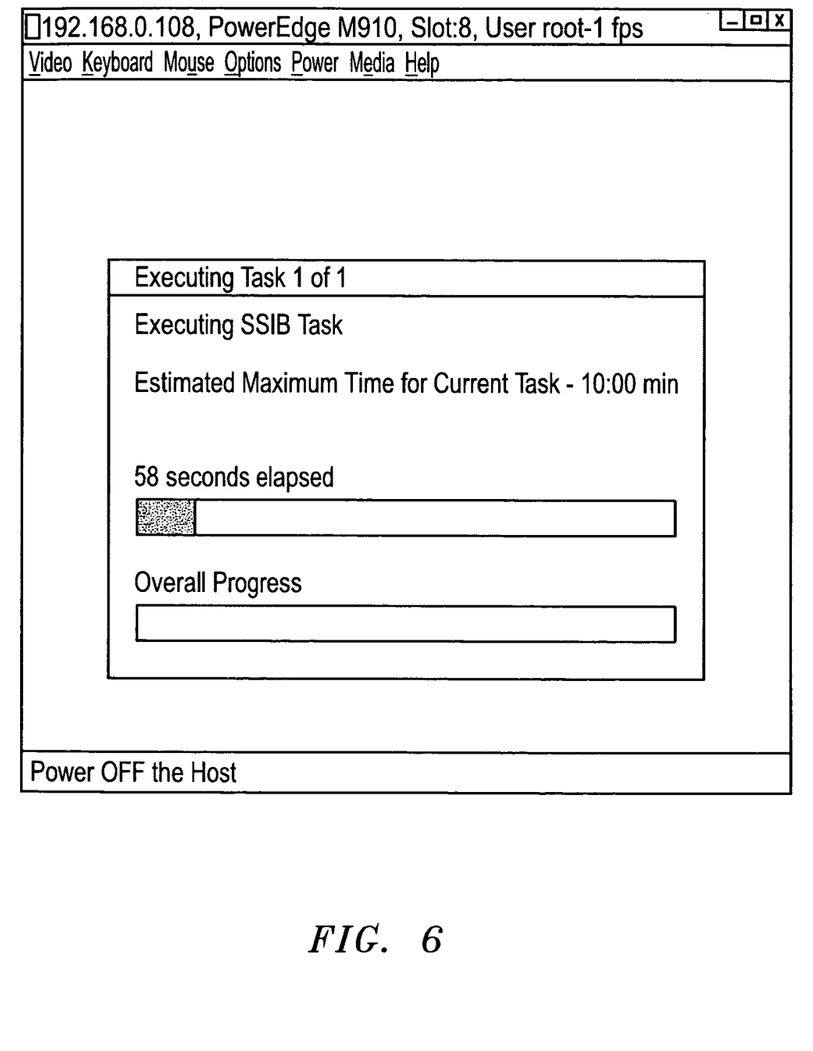
FIG. 6 illustrates display of status of an executing RAID configuration job according to one exemplary embodiment of the disclosed systems and methods.

Next, in step 510, out-of-band processor 108 (acting as a job processor) evaluates the requested and validated Raid Configuration Job by calling a Populator Method, and then initiates the execution of the requested and validated Raid Configuration Job by passing the execution environment to an execution module running on the in-band processor 106. Such an execution module running on the in-band processor 106 may be, for example, a DCS Raid Plug-In (DCSExecute) module running in an UEFI component of the USC environment 340 of in-band processor 106. This is shown in step 511, where out-of-band processor 108 exposes and makes accessible the RAID configuration data and job to in-band processor 106. In step 512, in-band processor 106 may then execute the requested RAID configuration job in the designated execution module, for example, after first rebooting in response to an appropriate command from out-of-band processor 108. Status of the executing RAID configuration job may be optionally displayed by the execution module to a user (e.g., via graphical interface) as shown in FIG. 6.

In-band processor 106 may be configured in one embodiment to act as a RAID processor that processes RAID configuration commands, such as those commands that specify "create", "delete", "change", "get", etc. Examples of RAID configuration commands include, but are not limited to, "Create RAID Configuration", "Delete RAID Configuration", "Get RAID Configuration", "Set RAID Configuration", "Reset RAID Configuration". Some specific command examples include, but are not limited to, SetControllerKey, GetRaidLevels, GetAvailableDisks, ClearForeignConfig, CreateVirtualDisks, etc. Once a Raid configuration job is completed in step 512 by in-band processor 106, the result may be passed back to out-of-band processor 108 in step 514 and then logged in a job store of data cache layer 310 in step 516, e.g. for purposes of displaying job status to an external client 128 who requests the job status.

It will be understood that methodology 500 of FIG. 5 is exemplary only and that fewer, additional, or alternative steps may be alternatively implemented in other embodiments. Furthermore, it will be understood that the configuration of the particular embodiments illustrated in FIGS. 1-4 is also exemplary, and that other configurations are possible.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system configured as a RAID server, the RAID server comprising:
   a RAID controller circuit for controlling the transfer of data to and from RAID storage memory that includes an array of individual storage disk drives;
   one or more processing devices;
   persistent storage embedded within the RAID server and coupled to the one or more processing devices, and to the RAID controller circuit; and
   an embedded remote RAID configuration framework present on the persistent storage, the remote RAID configuration framework being configured to:
      receive a request for RAID configuration from a remote user, and
      provide the received RAID configuration request to the one or more processing devices for processing;
   where the one or more processing devices are configured to:
      process the received RAID configuration request in an out-of-band manner to create a RAID configuration job corresponding to the received request for RAID configuration, and
      then execute the created RAID configuration job in an in-band manner.

2. The information handling system of claim 1, further comprising at least one external input/output (I/O) interface coupled to the one or more processing devices, the external I/O interface being configured for wired or wireless coupling to one or more devices that are external to the information handling system; and a remote access controller coupled to the external I/O interface and to each of the one or more processing devices, the remote access controller being configured to receive the request for RAID configuration from a remote user and provide the request for RAID configuration to the embedded remote RAID configuration framework.

3. The information handling system of claim 2, further comprising a system motherboard; and wherein the remote access controller and the persistent storage are embedded components on the motherboard of the information handling system.

4. The information handling system of claim 2, further comprising system BIOS firmware residing on the persistent storage; and wherein the embedded remote RAID configuration framework is configured to run on the remote access controller under a unified extension firmware interface ("UEFI") environment.

5. The information handling system of claim 1, where the one or more processing devices are further configured to provide the results of the executed RAID configuration job to the embedded remote RAID configuration framework; and where the embedded remote RAID configuration framework is configured to communicate with the RAID controller circuit to implement one or more RAID configuration or reconfiguration tasks resulting from the executed RAID configuration job.

6. The information handling system of claim 5, where the embedded remote RAID configuration framework is configured to provide the results of the executed RAID configuration job to the remote user.

7. The information handling system of claim 1, where the remote RAID configuration framework is further configured to receive a request for RAID reconfiguration from a remote user after the one or more processing devices have previously executed the RAID configuration job, the request for RAID reconfiguration specifying a different RAID configuration then the previous RAID configuration request; where the remote RAID configuration framework is further configured to provide the received RAID reconfiguration request to the one or more processing devices for out-of-band processing; where the one or more processing devices are further configured to process the received RAID reconfiguration request in an out-of-band manner to create a RAID reconfiguration job corresponding to the received request for RAID reconfiguration, and then execute the created RAID reconfiguration job in an in-band manner.

8. The system of claim 1, where the RAID server includes a chassis; and where each of the RAID controller circuit, one or more processing devices, and persistent storage are integrated within the RAID server chassis.

9. The system of claim 8, where the one or more processing devices are configured to perform the following steps on the RAID server as it is supplied directly out-of-the-box to a user in the same server configuration as shipped by the manufacturer or enterprise provider, and with no separate server providing RAID configuration information to the RAID server:
  process the received RAID configuration request in an out-of-band manner to create a RAID configuration job corresponding to the received request for RAID configuration; and
  then execute the created RAID configuration job in an in-band manner.

10. The system of claim 9, where the one or more processing devices are configured to perform the steps of processing the received RAID configuration request and then executing the created RAID configuration job without any separate management framework, external tools or plug-in.

11. A RAID system, comprising:
  a RAID storage memory that includes an array of individual storage disk drives;
  an information handling system configured as a RAID server coupled to the RAID storage memory, the server comprising:
    a RAID controller circuit for controlling the transfer of data to and from the RAID storage memory,
    an in-band processing device,
    an out-of-band processing device,
    persistent storage coupled to each of the in-band processing device, out-of-band processing device, and RAID controller circuit, and
    an embedded remote RAID configuration framework present on the persistent storage, the remote RAID configuration framework being configured to:
      receive a request for RAID configuration from a remote user, and
      provide the received RAID configuration request to the out-of band processing device;
    where the out-of-band processing device is configured to:
      create a RAID configuration job corresponding to the received request for RAID configuration, and
      provide the created RAID configuration job to the in-band processing device for execution;
    where the in-band processing device is configured to receive the created RAID configuration job from the out-of-band processing device and then execute the created RAID configuration job: and
    where the RAID server has a chassis; and where the RAID controller circuit, in-band processing device, out-of-band processing device, and persistent storage are integrated within the chassis.

12. The system of claim 11, further comprising at least one external input/output (I/O) interface coupled to each of the in-band and out-of-band processing devices, the external I/O interface being configured for wired or wireless coupling to one or more devices that are external to the information handling system; and a remote access controller coupled to the external I/O interface and to each of the in-band and out-of-band processing devices, the remote access controller being configured to receive the request for RAID configuration from a remote user and provide the request for RAID configuration to the embedded remote RAID configuration framework.

13. The system of claim 11, where the in-band processing device is further configured to provide results of the executed RAID configuration job to the out-of-band processing device; where the out-of-band processing device is further configured to provide the results of the executed RAID configuration job to the embedded remote RAID configuration framework; and where the embedded remote RAID configuration framework is configured to communicate with the RAID controller circuit to implement one or more RAID configuration or reconfiguration tasks resulting from the executed RAID configuration job.

14. The system of claim 13, where the embedded remote RAID configuration framework is configured to provide the results of the executed RAID configuration job to the remote user.

15. The system of claim 11, where the remote RAID configuration framework is further configured to receive a request for RAID reconfiguration from a remote user after the in- band processing device has previously executed the RAID configuration job, the request for RAID reconfiguration specifying a different RAID configuration then the previous RAID configuration request; where the remote RAID configuration framework is further configured to provide the received RAID reconfiguration request to the out-of band processing device; where the out-of-band processing device is further configured to create a RAID reconfiguration job corresponding to the received request for RAID reconfiguration, and provide the created RAID reconfiguration job to the in-band processing device for execution; and where the in-band processing device is further configured to receive the created RAID reconfiguration job from the out-of-band processing device and then execute the created RAID reconfiguration job.

16. The system of claim 11, wherein the remote RAID configuration framework is configured to receive the request for RAID configuration from a remote user via a wired or wireless network.

17. The system of claim 11, wherein the received request for RAID configuration includes at least one of "Create RAID Configuration", "Delete RAID Configuration", "Get RAID Configuration", "Set RAID Configuration", "Reset RAID Configuration" or a combination thereof.

18. A method for remotely configuring or reconfiguring a RAID system, comprising:
  providing a RAID storage memory that includes an array of individual storage disk drives;
  providing an information handling system configured as a RAID server coupled to the RAID storage memory, the server comprising:
    one or more processing devices,
    persistent storage coupled to the one or more processing devices, and
    an embedded remote RAID configuration framework present on the persistent storage;
  receiving a request in the embedded remote RAID configuration framework for RAID configuration from a remote user;

providing the received RAID configuration request from the embedded remote RAID configuration framework to the one or more processing devices for out-of-band processing;

using the one or more processing devices to process the received RAID configuration request in an out-of-band manner to create a RAID configuration job; and using the one or more processing devices to execute the created RAID configuration job in an in-band manner; and where the RAID server has a chassis; where the RAID controller circuit, one or more processing devices, and persistent storage are integrated within the chassis.

19. The method of claim 18, further comprising providing the results of the executed RAID configuration job from the one or more processing devices to the embedded remote RAID configuration framework; and communicating with the RAID controller circuit to implement one or more RAID configuration or reconfiguration tasks resulting from the executed RAID configuration job.

20. The method of claim 19, further comprising providing the results of the executed RAID configuration job from the embedded remote RAID configuration framework to the remote user.

21. The method of claim 18, further comprising:

receiving a request for RAID reconfiguration from a remote user after the one or more processing devices have previously executed the RAID configuration job, the request for RAID reconfiguration specifying a different RAID configuration then the previous RAID configuration request;

providing the received RAID reconfiguration request from the embedded remote RAID configuration framework to the one or more processing devices for out-of-band processing;

using the one or more processing devices to process the received RAID reconfiguration request in an out-of-band manner to create a RAID configuration job; and using the one or more processing devices to execute the created RAID reconfiguration job in an in-band manner.

22. The method of claim 18, further comprising remotely configuring or reconfiguring the RAID system without loading or downloading any additional RAID configuration firmware or software.

23. The method of claim 18, where the one or more processing devices comprise an in-band processing device and a separate out-of-band processing device; and where the method further comprises using the out-of-band processing device to create and store the created RAID configuration job in storage space within the embedded persistent storage in one or more files that are accessible by the out-of band processing device by direct mount, and that are accessible by the in-band processing device through virtual media attachment.

24. The method of claim 23, further comprising using the out-of-band processing device to expose the RAID configuration data job to the in-band processing device after creating and storing the RAID configuration job; then using the out-of-band processor to command the in-band processing device to reboot; then rebooting the in-band processing device in response to the command from the out-of-band processing device; then using the in-band processing device to execute the created RAID configuration job; and then providing results of the executed RAID configuration job from the in-band processing device to the out-of-band processing device.

25. The method of claim 24, further comprising running an execution module on the in-band processing device; and using the execution module to display the status of the executing RAID configuration job to a user via graphical interface.

26. A method of providing an information handling system configured as a RAID server, the method comprising providing the information handling system before first coupling the RAID server to a RAID storage memory, the provided information handling system comprising:

a RAID controller circuit for controlling the transfer of data to and from RAID storage memory that includes an array of individual storage disk drives;

one or more processing devices;

persistent storage embedded within the server and coupled to the one or more processing devices, and to the RAID controller circuit; and an embedded remote RAID configuration framework present on the persistent storage, the remote RAID configuration framework being configured to:

receive a request for RAID configuration from a remote user, and provide the received RAID configuration request to the one or more processing devices for processing; and where the one or more processing devices are configured to:

process the received RAID configuration request in an out-of-band manner to create a RAID configuration job corresponding to the received request for RAID configuration, and then execute the created RAID configuration job in an in-band manner.

27. The method of claim 26, where the RAID server includes a chassis; where each of the RAID controller circuit, one or more processing devices, and persistent storage are integrated within the RAID server chassis; and where the method further comprises using the one or more processing devices to perform the following steps on the RAID server as it is supplied directly out-of-the-box to a user in the same server configuration as shipped by the manufacturer or enterprise provider, and with no separate server providing RAID configuration information to the RAID server:

processing the received RAID configuration request in an out-of-band manner to create a RAID configuration job corresponding to the received request for RAID configuration; and then executing the created RAID configuration job in an in-band manner.

28. The method of claim 27, further comprising using the one or more processing devices to perform the steps of processing the received RAID configuration request and executing the created RAID configuration job without any separate management framework, external tools or plug-in.

* * * * *